Dec. 2, 1958     J. J. DELISO     2,862,411
SOCKET WRENCH SET
Original Filed March 1, 1954
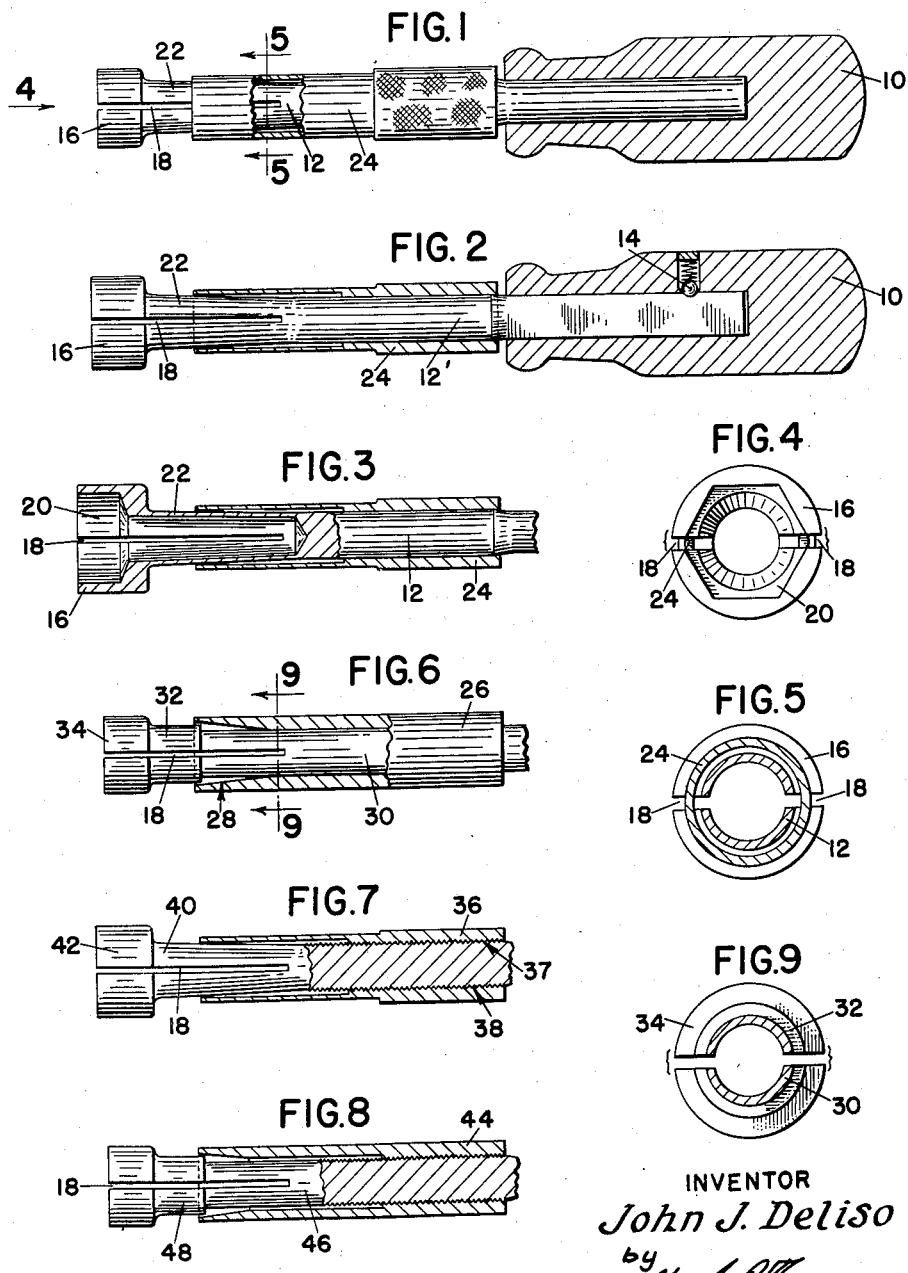
INVENTOR
John J. Deliso
by
ATTORNEY

United States Patent Office 2,862,411
Patented Dec. 2, 1958

2,862,411

SOCKET WRENCH SET

John J. Deliso, Worcester, Mass.

Original application March 1, 1954, Serial No. 413,034, now Patent No. 2,775,914, dated January 1, 1957. Divided and this application July 11, 1956, Serial No. 597,165

2 Claims. (Cl. 81—114)

This is a division of my prior application Serial No. 413,034 filed by me March 1, 1954, now Patent No. 2,775,914 dated January 1, 1957.

This invention relates to a new and improved socket wrench set, and the principal object of the invention relates particularly to socket wrench sets which include a shank having a longitudinal slot at one end and an enlarged head on said shank in the slotted area, the head being recessed to receive a nut and including a sleeve on on the shank for compressing or contracting the slotted portions of the shank and the head to grip the nut therein to apply the nut when desired without the danger of dropping the same, wherein the set of socket wrenches includes shanks and sleeves of exactly equal size and diameter but wherein the heads are of different sizes for the reception of different sizes of nuts; to the end that the sleeves may be made exactly alike for all of the wrenches, regardless of the size thereof providing for reduced expense in manufacture and increased economy, to the ultimate purchaser.

Further objects of the invention include the provision of a device as above described wherein the shank is tapered but the sleeve is straight and cylindrical and does not taper in conformance with the taper of the shank, said sleeve presenting a forward circular edge for bearing upon the shank at the taper part thereof for contracting the same; and the provision of a nut-gripping socket wrench including the slotted shank and cylindrical sleeve as above described but wherein the shank is stepped and the sleeve is internally tapered, presenting a bell mouth, so that the latter engages the edge of the step on the shank to compress the same when the sleeve with the bell mouth is moved along the shank and the bell mouth engages the step for the purpose described; and the provision of tools and sets of tools as above described including interengaging means between the shank and the sleeve for traveling or moving the sleeve on the shank, said means including external threads on the shank and co-operating threads on the sleeve, so that when the sleeve is rotated, it is moved longitudinally on the shank for the purposes described above.

Other objects and advantages of the invention will appear hereinafter.

Reference is to be had to the accompanying drawings, in which

Fig. 1 is a side elevation of a socket wrench according to the present invention, a part being broken away and parts being in section;

Figs. 2 and 3 are views similar to Fig. 1, parts being in section, and showing wrench heads of different sizes;

Fig. 4 is an enlarged front elevation, looking in the direction of arrow 4 in Fig. 1;

Fig. 5 is an enlarged section on line 5—5 of Fig. 1;

Fig. 6 is a sectional view through the sleeve, showing a modification;

Fig. 7 is a view similar to Fig. 2 showing another modification;

Fig. 8 shows a still further modification; and

Fig. 9 is an enlarged-scale section on line 9—9 of Fig. 6 but with the sleeve omitted.

In carrying out the present invention, there is provided a handle 10. This handle may be of any size, shape or material, and it is provided with a shank 12 which may be solidly fastened in the handle as in Fig. 1, or removably associated therewith and held therein by any desired means such as a detent and ball arrangement illustrated at 14 as to the shank 12' in Fig. 2. The end portion of shank 12 will be square in cross section when used with the detent and ball.

At its outer end, the shank 12 is enlarged in a head generally indicated at 16. This head is split or slotted at 18, the slot extending down into the shank for an appreciable distance.

The head 16 is hollowed out as at 20 to receive a nut and it will be seen that the heads in Figs. 1, 2 and 3 are all of different sizes but the shank 12 in each instance is of the same external diameter and the handles may be of the same construction also.

The shank 12 is tapered from the surface of the shank outwardly toward the head as at 22 and this taper co-operates with a sliding sleeve 24 mounted on the shank 12 between the handle and the respective heads. The sleeves 24 are all exactly the same size as to length and diameter and they are straight and cylindrical and may be interchanged on the shanks 12, regardless of the respective heads for the different sizes of wrenches.

The sleeves 24 are adapted to be slid toward the heads to engage the tapering portions 22 and cause the two split parts of the head to come together to grip a nut. The friction of the taper and the sleeve will be sufficient to hold the parts in clamped position and it requires a positive action by the user to retract the sleeve 24 from the tapered portion 22 to release the nut.

In Fig. 6 there is shown a modification wherein the sleeve 26 is similar to that at 24 but is interiorly tapered as at 28 at its forward edge, presenting a bell-mouth. In this case, the shank 30 is straight and cylindrical and does not have a taper but instead it is provided with a hub or stepped portion 32 just behind the head 34. With this construction, the action is somewhat the same as before. When the sleeve 26 is slid to the left, the taper 28 engages the circumferential edge of the hub 32 and creates inward pressure for gripping the nut as before.

Fig. 7 is similar to the disclosure in Fig. 2, but in this case the sleeve 36 is provided with interior threads 37 meshing with exterior threads 38 on the shank. The sleeve may be rotated on the shank and thus advanced, contacting the tapered portion 40 similar to that at 22, causing the head parts 42 to move toward each other and grip the nut. These threads will create a more positive lock which will not be disturbed, even under conditions of impact which might possibly dislodge the sleeve of Figs. 1 and 6.

Fig. 8 is similar to Fig. 7 and shows the threaded interconnection between the sleeve 44 and shank 46, but in this case the construction is similar to that of Fig. 6 wherein there is no taper on the shank but instead there is a stepped structure 48 as shown. In this case, the action is similar to that of Fig. 6 with the additional provision of the positive lock as described above with reference to Fig. 7.

Having thus described my invention and the advantages thereof, I do not wish to be limited to the details herein disclosed, otherwise than as set forth in the claims, but what I claim is:

1. A socket wrench comprising a shank having a longitudinal slot at an end thereof, a head bisected by the slot at the slotted end of the shank, a reduced cylindrical step on the shank next to the head, said cylindrical step being greater in diameter than the shank, a straight, hollow cylindrical sleeve movable on the shank, said sleeve having a bellmouth at its end adjacent the step, the internal diameter of the outer end of said bellmouth being initially great enough to include the sep and decreasing inwardly to an internal diameter slightly greater than the shank but less than that of the step, said bellmouth being engageable with the step to compress the head.

2. The socket wrench of claim 1 including means to move the sleeve longitudinally of the shank wherein the shank and sleeve ar co-operatively threaded.

References Cited in the file of this patent
UNITED STATES PATENTS

| | | |
|---|---|---|
| 259,892 | Metten | June 20, 1882 |
| 428,019 | Pugh | May 13, 1890 |
| 852,290 | Neal | Apr. 30, 1907 |
| 1,529,006 | Bodmer | Mar. 10, 1925 |
| 1,690,018 | Kerfoot | Oct. 30, 1928 |
| 2,701,494 | Johnson | Feb. 8, 1955 |

FOREIGN PATENTS

| | | |
|---|---|---|
| 11,292 | Great Britain | May 14, 1913 |
| 77,526 | Norway | Aug. 20, 1951 |
| 728,789 | France | Apr. 18, 1932 |